United States Patent
Whitman, Jr.

(10) Patent No.: US 7,551,602 B2
(45) Date of Patent: Jun. 23, 2009

(54) RESOURCE ASSIGNMENT IN A DISTRIBUTED ENVIRONMENT

(75) Inventor: Raymond Whitman, Jr., Grayson, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 927 days.

(21) Appl. No.: 10/741,650

(22) Filed: Dec. 19, 2003

(65) Prior Publication Data

US 2005/0165930 A1    Jul. 28, 2005

(51) Int. Cl.
*H04L 12/56* (2006.01)

(52) U.S. Cl. .......................... 370/352; 370/401; 705/8

(58) Field of Classification Search .................. 370/310
See application file for complete search history.

(56) References Cited

U.S. PATENT DOCUMENTS

| | | | |
|---|---|---|---|
| 5,185,780 A | 2/1993 | Leggett | |
| 5,872,938 A | 2/1999 | Williams | |
| 5,903,641 A | 5/1999 | Tonisson | |
| 5,963,635 A | 10/1999 | Szlam et al. | |
| 5,974,414 A | 10/1999 | Stanczak et al. | |
| 5,991,390 A * | 11/1999 | Booton | 379/265.02 |
| 6,044,355 A | 3/2000 | Crockett et al. | |
| 6,490,252 B1 | 12/2002 | Riggan et al. | |
| 6,493,446 B1 | 12/2002 | Cherry | |
| 6,584,191 B1 | 6/2003 | McPartlan et al. | |
| 6,639,982 B1 | 10/2003 | Stuart et al. | |
| 6,775,378 B1 | 8/2004 | Villena et al. | |
| 6,842,515 B2 | 1/2005 | Mengshoel et al. | |
| 6,865,266 B1 | 3/2005 | Pershan | |
| 6,996,076 B1 * | 2/2006 | Forbes et al. | 370/310 |
| 7,023,979 B1 | 4/2006 | Wu et al. | |
| 7,103,562 B2 | 9/2006 | Kosiba et al. | |
| 7,203,655 B2 | 4/2007 | Herbert et al. | |
| 7,321,657 B2 | 1/2008 | Whitman | |
| 2001/0034637 A1 | 10/2001 | Lin et al. | |
| 2001/0038689 A1 * | 11/2001 | Liljestrand et al. | 379/201.03 |
| 2001/0043586 A1 | 11/2001 | Miloslavsky | |
| 2002/0041673 A1 | 4/2002 | Berrondo et al. | |
| 2002/0143599 A1 | 10/2002 | Nourbakhsh et al. | |
| 2002/0157043 A1 | 10/2002 | Hite et al. | |
| 2002/0159439 A1 * | 10/2002 | Marsh et al. | 370/352 |
| 2003/0007622 A1 | 1/2003 | Kalmanek et al. | |
| 2003/0095652 A1 | 5/2003 | Mengshoel et al. | |
| 2003/0231595 A1 | 12/2003 | Zino et al. | |

(Continued)

OTHER PUBLICATIONS

Whitman; Advisory Action mailed Dec. 31, 2007 for U.S. Appl. No. 10/741,612, filed Dec. 19, 2003.

(Continued)

*Primary Examiner*—Creighton Smith
(74) *Attorney, Agent, or Firm*—Greenblum & Bernstein, P.L.C.

(57) ABSTRACT

Systems and methods for using softswitches in service center applications allow more efficient workforce utilization and more flexibility in staffing service centers. Communication between at least one force management system and at least one softswitch can be used to efficiently distribute service requests to service agents including at least one remote service agent. The remote service agent may be connected across the Internet (or other telecommunications technology for network access) and may use voice-over-IP and/or virtual private networking (VPN) technologies. Furthermore, the remote service agent may receive electronic invitations to work that are based on call service request demand levels.

20 Claims, 8 Drawing Sheets

U.S. PATENT DOCUMENTS

| | | | |
|---|---|---|---|
| 2004/0062231 | A1 | 4/2004 | Wyatt |
| 2004/0128379 | A1 | 7/2004 | Mizell et al. |
| 2004/0138944 | A1 | 7/2004 | Whitacre et al. |
| 2004/0165531 | A1 | 8/2004 | Brady |
| 2004/0165716 | A1 | 8/2004 | Galvin |
| 2004/0168100 | A1 | 8/2004 | Thottan et al. |
| 2005/0007955 | A1 | 1/2005 | Schrodi |
| 2005/0013287 | A1 | 1/2005 | Wallentin et al. |
| 2005/0043986 | A1 | 2/2005 | McConnell et al. |
| 2005/0071211 | A1 | 3/2005 | Flockhart et al. |
| 2005/0131748 | A1* | 6/2005 | Parker .................. 705/8 |
| 2005/0135600 | A1 | 6/2005 | Whitman |
| 2005/0135601 | A1 | 6/2005 | Whitman |
| 2005/0137893 | A1 | 6/2005 | Whitman |
| 2005/0138167 | A1 | 6/2005 | Whitman |
| 2005/0160142 | A1 | 7/2005 | Whitman |
| 2005/0175971 | A1 | 8/2005 | Mcilwaine et al. |
| 2006/0120282 | A1 | 6/2006 | Carlson et al. |

OTHER PUBLICATIONS

Whitman; Advisory Action mailed Feb. 20, 2008 for U.S. Appl. No. 10/741,738, filed Dec. 19, 2003.

Whitman; Non-Final Rejection mailed Apr. 15, 2008 for U.S. Appl. No. 10/741,738, filed Dec. 19, 2003.

Whitman; Examiner Interview Summary Record mailed Feb. 5, 2008 for U.S. Appl. No. 10/741,643, filed Dec. 19, 2003.

Whitman; Final Rejection mailed Apr. 3, 2008 for U.S. Appl. No. 10/741,643, filed Dec. 19, 2003.

Whitman; Examiner Interview Summary Record mailed Aug. 23, 2005 for U.S. Appl. No. 10/741,643, filed Dec. 19, 2003.

Whitman; Notice of Allowance and Fees Due mailed Oct. 2, 2007 for U.S. Appl. No. 10/740,873, filed Dec. 19, 2003.

Whitman; Non-Final Rejection mailed Oct. 5, 2007 for U.S. Appl. No. 10/741,643, filed Dec. 19, 2003.

Whitman; Final Rejection mailed Oct. 17, 2007 for U.S. Appl. No. 10/741,612, filed Dec. 19, 2003.

Whitman; Final Rejection mailed Nov. 20, 2007 for U.S. Appl. No. 10/741,738, filed Dec. 19, 2003.

Whitman; Non-Final Rejection mailed Dec. 12, 2007 for U.S. Appl. No. 10/740,874, filed Dec. 19, 2003.

Whitman; Non-Final Rejection mailed Jan. 10, 2008 for U.S. Appl. No. 10/741,394, filed Dec. 19, 2003.

Whitman; U.S. Appl. No. 10/740,873, filed Dec. 19, 2003.

Whitman; U.S. Appl. No. 10/740,874, filed Dec. 19, 2003.

Whitman; U.S. Appl. No. 10/741,394, filed Dec. 19, 2003.

Whitman; U.S. Appl. No. 10/741,612, filed Dec. 19, 2003.

Whitman; U.S. Appl. No. 10/741,643, filed Dec. 19, 2003

Whitman; U.S. Appl. No. 11/960,238, filed Dec. 19, 2003.

Whitman; U.S. Appl. No. 10/741,738, filed Dec. 19, 2003.

Whitman; Notice of Allowance and Fees Due mailed May 28, 2008 for U.S. Appl. No. 10/741,612, filed Dec. 19, 2003.

Whitman; Examiner Interview Summary mailed May 20, 2008 for U.S. Appl. No. 10/741,643, filed Dec. 19, 2003.

Vijay Mehrotra and Jason Fama; entitled "Call Center Simulation Modeling: Methods, Challenges and Opportunities"; 2003 Winter Simulation Conference; 9 pages.

Roger Klungle; entitled "Simulation of a Claims Call Center: A Success and a Failure"; 1999 Winter Simulation Conference; 6 pages.

Vivek Bapat and Eddie B. Pruitte, Jr.; entitled "Using Simulation in Call Centers"; 1998 Winter Simulation Conference; 5 pages.

Raymond Whitman Jr.; Non-Final Rejection, mailed Jul. 6, 2007, for U.S. Appl. No. 10/740,874, filed Dec. 19, 2003.

Raymond Whitman Jr.; Non-Final Rejection; mailed Oct. 10, 2006, for U.S. Appl. No. 10/740,873, filed Dec. 19, 2003.

Raymond Whitman Jr.; Final Rejection; mailed Apr. 11, 2007, for U.S. Appl. No. 10/740,873, filed Dec. 19, 2003.

Raymond Whitman Jr.; Non-Final Rejection; mailed Jan. 16, 2007, for U.S. Appl. No. 10/741,612, filed Dec. 19, 2003.

Raymond Whitman Jr.; Final Rejection; mailed Jul. 6, 2007, for U.S. Appl. No. 10/741,612, filed Dec. 19, 2003.

Raymond Whitman Jr.; Non-Final Rejection; mailed Sep. 11, 2006, for U.S. Appl. No. 10/741,738, filed Dec. 19, 2003.

Raymond Whitman Jr.; Non-Final Rejection; mailed Mar. 12, 2007, for U.S. Appl. No. 10/741,738, filed Dec. 19, 2003.

Raymond Whitman Jr.; Non-Final Rejection; mailed Jul. 24, 2007, for U.S. Appl. No. 10/741,738, filed Dec. 19, 2003.

Raymond Whitman Jr.; Non-Final Rejection; mailed Aug. 3, 2005, for U.S. Appl. No. 10/741,643, filed Dec. 19, 2003.

Raymond Whitman Jr.; Final Rejection; mailed Jan. 25, 2006, for U.S. Appl. No. 10/741,643, filed Dec. 19, 2003.

Raymond Whitman Jr.; Non-Final Rejection; mailed Aug. 2, 2006, for U.S. Appl. No. 10/741,643, filed Dec. 19, 2003.

Raymond Whitman Jr.; Final Rejection; mailed Feb. 6, 2007, for U.S. Appl. No. 10/741,643, filed Dec. 19, 2003.

Raymond Whitman Jr.; Pre-Brief Appeal Conference decision; mailed Jul. 18, 2007, for U.S. Appl. No. 10/741,643, filed Dec. 19, 2003.

* cited by examiner

| TIME (HH:MM) | 00:00 | 00:15 | 00:30 | ● ● ● | 23:15 | 23:30 | 23:45 |
|---|---|---|---|---|---|---|---|
| WORK-FORCE #1 | 13 | 18 | 19 | ● ● ● | 14 | 12 | 12 |
| WORK-FORCE #2 | 30 | 28 | 25 | ● ● ● | 35 | 33 | 32 |
| WORK-FORCE #3 | 8 | 9 | 9 | ● ● ● | 7 | 8 | 8 |

NUMBER OF EMPLOYEE SERVICE AGENTS ASSIGNED TO A WORKFORCE

FIG. 4

RESOURCE ASSIGNMENT IN A DISTRIBUTED ENVIRONMENT

CROSS-REFERENCE TO RELATED APPLICATIONS

This application is one of seven related co-pending U.S. utility patent applications, which are all filed on the same day as the present application. The other six patent applications, which are each incorporated in their entireties by reference herein, are:

U.S. patent application Ser. No. 10/740,874;
U.S. patent application Ser. No. 10/740,873;
U.S. patent application Ser. No. 10/741,612;
U.S. patent application Ser. No. 10/741,738;
U.S. patent application Ser. No. 10/741,394; and
U.S. patent application Ser. No. 10/741,643.

TECHNICAL FIELD

The present disclosure is generally related to efficient staffing and service request distribution of at least one service center that processes requests for service transmitted over telecommunication facilities.

BACKGROUND

For many types of processes, queuing theory is used in modeling the performance of systems based on quantities such as, but not limited to, expected or anticipated arrival rates of service requests and server processing performance rates. In general, the items moving through a queuing system are referred to in different contexts as customers in the case of queues at fast food restaurants and supermarkets, as calls in the case of circuit-switched telephone switching and trunking networks, as packets in the case of packet networks, and as jobs or processes in the case of programs running on computer processors. In queuing theory models, generally the entities that process service requests are called servers, regardless of whether the server is a person or a processor in a machine. More complicated queuing systems can be made up of networks of queues.

With the advent of various digital technologies, many types of service requests communicated over telecommunication facilities have been automated. For instance, Internet search engines have simplified some look-up tasks. As another non-limiting example, telephone requests for bank balances may now be handled using integrated voice response (IVRs) or voice response units (VRUs) that generally process dual-tone multi-frequency (DTMF) or touch tone recognition systems that allow customers to enter account numbers and passwords. In addition, more sophisticated signal processing techniques now might use voice or speech recognition technology to interpret a customer's request for service that is transmitted over a telephone call. Queuing theory may be used in properly sizing the equipment needed to meet these service requests of customers based on expected probability distributions and timing of customer requests. From an economic standpoint, it is important to provide reasonable customer service using such systems while using the minimum amount of expensive hardware. Here queuing theory helps to determine the amount of equipment needed to meet performance objectives.

Despite the amazing capabilities of digital equipment, some tasks are still best performed by humans. For instance, even with the amazing improvements in speech recognition, humans are still much better at interpreting verbal messages from another human even when the verbal messages are communicated over telecommunication facilities. Also, although some Internet search engines over natural language format searches, the ability of computers to interpret grammar, semantics, and context for natural human language is still quite limited. Thus, human beings may still be better at processing natural language requests even though the requests may be typed into a computer.

While queuing theory is useful in properly sizing the equipment needed for processing some service requests, such as but not limited to Boolean Internet searches, VRU requests, and voice recognition requests, which are communicated over telecommunication facilities, queuing theory may also be used in properly sizing the number of human beings needed to handle service requests that cannot be easily dealt with using digital technology. One common non-limiting example of service requests that might be handled by human service agents is an inbound call center that handles telephone orders for sporting event tickets or goods. Other common non-limiting examples are directory assistance and operator services of a telephone company. In addition, the 911 emergency phone number generally is directed to an inbound call center. While many inbound call centers process human voice communications to interpret and respond to a customer's service request, some call centers also offer the ability to communicate with handicapped customers who may be deaf and/or mute, and may use special terminals to type in natural language queries of request for service. These natural language service requests may still be processed by human service agents or human servers as opposed to digital machines. Thus, human service agents handle more types of service requests, which are transmitted over telecommunication facilities, than are just communicated over the telecommunication facilities as voice signals of human language.

Generally, service centers using telecommunications facilities may be categorized as inbound and/or outbound centers. In the case of call centers handling telephone calls, outbound centers typically generate outbound phone calls for applications such as, but not limited to, telemarketing, charitable donation solicitation, and survey completion solicitation. Inbound call centers generally handle inbound phone calls that may be processed using equipment such as an Automated Call Distributor (ACD) that directs calls to an available server (human or machine) to properly handle customer service requests. Also, a particular call center may perform both inbound and outbound activities such that the categories of inbound and outbound are not mutually exclusive.

Staffing a service center with the proper number of human service agents to efficiently handle the volume or load of incoming service requests, which are transmitted over telecommunication facilities, is an important business and technical problem. On the one hand, it is expensive to overstaff a service center with too many human service agents that will be underutilized. Also, understaffing a service center with too few human service agents could lead to poor customer service and possibly loss of sales revenue. Workforce management systems or force management systems (FMSes) have been developed to help managers with the resource planning of staffing a service center. However, these FMS systems usually are not fully integrated with the ACD or other service request distribution equipment. This lack of integration misses some opportunities to improve the efficiency of systems handling incoming service requests transmitted over telecommunication facilities.

Thus, a heretofore unaddressed need exists in the industry to address the aforementioned deficiencies and inadequacies.

SUMMARY

Embodiments, among others, of the present disclosure include systems and methods for using softswitches in service center applications.

Briefly described, in architecture, embodiments of the system, among others, are implemented as follows. At least one force management system is configured to communicate with at least one softswitch to efficiently distribute service requests to service agents including at least one remote service agent. The remote service agent typically is connected across the Internet (or other telecommunications technology for network access) and uses voice-over-IP and/or virtual private networking (VPN) technologies. Furthermore, the remote service agent may receive electronic invitations to work that are based on call service request demand levels.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is an employee staffing schedule for human service agents.

DETAILED DESCRIPTION

Figure 1:
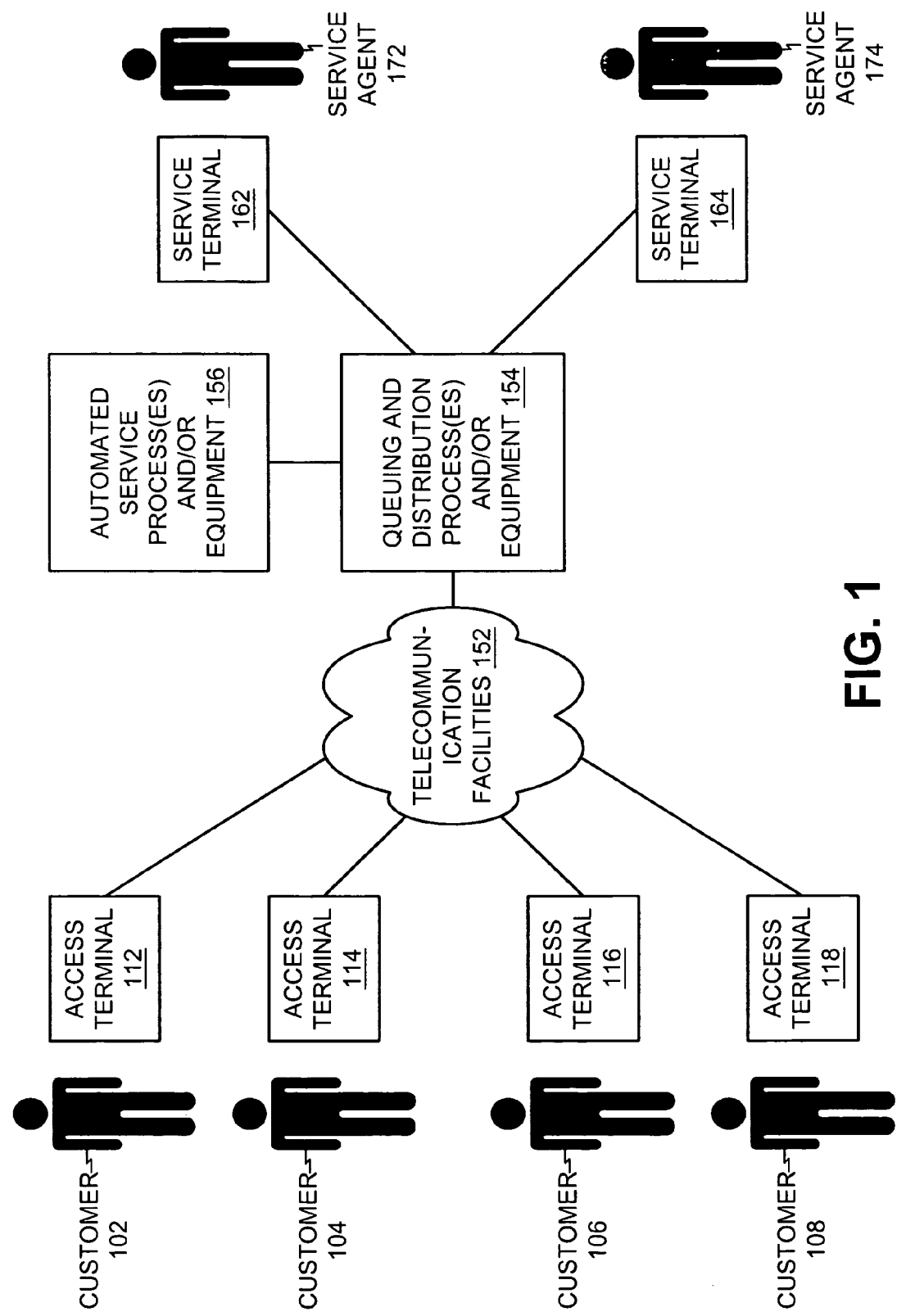
FIG. 1 is a block diagram of a customer service center.

Reference is now made in detail to the description of the embodiments as illustrated in the drawings. While several embodiments are described in connection with these drawings, there is no intent to limit the embodiment or embodiments disclosed herein. On the contrary, the intent is to cover all alternatives, modifications, and equivalents. Additionally, while the following description and accompanying drawings specifically describe service centers in the call center context, the embodiments of the present disclosure are not to be limited to call centers. Moreover, the embodiments of the present disclosure will be described with respect to the operator services call center of a telephone company. However, the concepts of the embodiments are extendable to cover other types of call centers and service centers in which service requests are communicated using telecommunication facilities before being distributed using automated distribution equipment and/or processes (such as, but not limited to an ACD) to be processed by human service agents or humans as servers of the service requests.

Unlike machine servers, the use of human service agents as servers to handle service requests has some additional constraints as a result of human physiology and work contract expectations. Unlike machines, human beings tire out on a daily basis. Thus, 24-hour-by-7-day-a-week coverage of service using human service agents usually results in various work shifts whereas machines may be expected to operate 24×7 with only minimal downtime. Also, humans expect certain off days and vacations from work. As a result of these complexities, work force management systems or force management systems were developed to help in staffing service centers with the proper number of human servers and resolving contracted work rights such as vacation days, holidays, and other human specific issues.

One of the early pioneers of queuing theory was Danish mathematician A. K. Erlang, who developed many formula for queuing system performance and server sizing determination. In particular the Erlang C formula and other variations are often used in Force Management Systems (FMSes) to estimate the number of human servers needed to handle service requests arriving based on some arrival distribution with some non-limiting characteristics of an arrival distribution being instantaneous and average arrival rates of service requests. In general, the processing rates of servers (machine or human) handling service requests should on average equal the arrival rate of the service requests. For short periods of time, mismatches in service request arrival rates and service request processing rates of servers can be dealt with by buffering the speed mismatches in structures usually called queues. Commonly, queues operate on a first-come, first-served (FCFS) or first-in, first-out (FIFO) priority order. However, other queue servicing priority schemes also may be employed.

In the case of server processing performance of computer servers, a common metric or measurement is cycles per second or Hertz, although commonly this measurement is scaled into Mega-Hertz (MHz) or Giga-Hertz (GHz). As a non-limiting example, if each service request on a processor requires 5 cycles per service request, and a machine processor runs at 2 GHz or 2,000,000,000 cycles per second, then such a machine could process service requests at a rate of (1 service request/5 cycles)×(2,000,000,000 cycles/second)=400,000,000 service requests per second at 100% utilization. To the extent that a processor does not spend 100% of its time handling the service, but only handles service requests 90% of the time, a processor utilization level of 90% would lead to a processor handling (400,000,000 service request/second)× 90%=360,000,000 service requests per second.

Similarly, human service agents also have service performance metrics. In the case of call centers, each call might be considered as a service request. On average, a human service agent might be able to process 2 phone call service requests per minute or in 60 seconds. Thus, the processing rate for such a person is 2 calls per 60 seconds, 1 call per 30 seconds, or 0.0333 calls/second. The reciprocal of this processing rate is 1/(1 call/30 seconds)=30 seconds per call, which is known as the average work time (AWT) for a human service agent with a service request processing rate of 1 call/30 seconds. A human service agent with a processing rate of 1 call per 30 seconds could handle (15 minutes)×(60 seconds/minute)×(1 call/30 seconds)=30 calls in 15 minutes at a 100% utilization level.

In the case of human server agents, utilization is normally called occupancy. For many call centers, human service agents usually login to specify that they are ready and available to receive calls from the automated call distribution (ACD) equipment. By logging in, the human server agents are essentially informing the ACD that the human server agents are online and capable of processing transactions. Occupancy is a measurement of the amount of time that a human service agent is processing calls out of the time during which the human service agent is logged into the call distribution system. Thus, occupancy is a measure of the utilization level of a person in handling calls. Also, occupancy can be measured for a group of human service agents as well as for individual human service agents. As occupancy is a utilization measurement, a human service agent that operates at 90% occupancy with a processing rate of 0.0333 calls per second (or an AWT of 30 seconds/call) can handle 90%×(0.0333 calls/second)= 0.03 calls/second. A human service agent with a processing rate of 1 call per 30 seconds and a 90% occupancy level could handle 90%×(15 minutes)×(60 seconds/minute)×(1 call/30 seconds)=90%×30 calls=27 calls in 15 minutes at a 90% utilization or occupancy level. Unlike machines, human beings tend to tire out at 100% utilization levels. Thus, most service centers shoot for occupancy levels somewhere below 100%.

Another approach for this computation is to use centum call-seconds (CCS) as the base unit for the calculation. In a time interval of 15 minutes, there are 15 minutes×(60 seconds/1 minute)=900 seconds in which one or more calls (or service requests) may be serviced or processed by a server or service agent. (A 15-minute interval is only for example purposes, and the embodiments of the present disclosure are not to be limited only to systems and/or measurements using 15 minute intervals.) A server or service agent capable of performing processing on one service request at any instance of time can handle 900 one-second long service requests or one 900-second service request in the 900 seconds of a 15 minute interval. If the service requests are phone calls, then the load on the server is 900 calls×1 second=900 call-seconds or 1 call×900 seconds=900 call-seconds, respectively. Thus, in either case a server capable of handling one service request at any instance of time over a 900-second interval is capable of handling a load of 900 call-seconds per server, in the non-limiting case where the service requests are calls. Also, all the calls or service requests do not have to have the same processing duration. As another non-limiting example, a 900 call-second load could be composed of one 500-second call and one 400-second call. As one skilled in the art will be aware, the potential load on the server includes all possible combinations of various numbers of calls multiplied by the processing duration associated with each call, with the sum of each call multiplied by each call's duration totaling to a workload of 900 call-seconds.

For some non-limiting types of service centers, each server or service agent may only handle a single service request at any given time. However, the embodiments of this disclosure are not limited to such sequential processing of service requests, and in the general case a server might even be capable of performing the processing on multiple service requests in parallel. Furthermore, even a server capable of only performing processing on a single first service request at any instance of time need not complete the entire processing of that first service request before 1) placing that first service request on hold, 2) performing processing on a second service request, and 3) returning to process the first service request at a later time. Different types of service centers may have different policy rules regarding the order of handling service requests, and some implementations using the embodiments of the present disclosure may have service-request processing-order policy restrictions, while other implementations do not have such restrictions. A simplistic example of a human service agent that performs server processing to handle service requests is a telephone attendant, receptionist, or operator for a business. The phone system attendant may place a first incoming phone call or service request on hold in order to answer a second incoming phone call. Then the receptionist would return to handling the first call at a later time.

In general, human service agents may only communicate in one telephone conversation at any instance because human physiology for telephone conversations basically has one output channel through speech and one input channel through the sense of hearing. (Although each of a person's two ears could provide a separate input channel and various means could be devised to generate additional audio output channels, such techniques generally are not common for telephone conversation processing by humans.) Therefore, for the non-limiting case where a human being is used as a server to handle service requests that are telephone calls, the server generally communicates over the phone on at most one call at any instance such that the maximum work load of 900 call-seconds in a 15 minute interval is a per server or per human service agent number (i.e., 900 call-seconds/server or, in the case of human service agents, 900 call-seconds/service agent).

Instead of using call-seconds as the units for work load, one skilled in the art often may use units of hundreds of call-seconds or centum call-seconds (CCS), or even the unit of Erlangs to ease the representation of workload numbers. As one skilled in the art will be aware, a centum call-second (CCS) is 1 call occupying a channel (or server) for 100 seconds. Also, one skilled in the art will be aware that an Erlang is one call occupying a channel (or server) for one hour or 1 Erlang=36 CCS.

Thus, the potential volume or load for a call using the 900 seconds is 1 call×900 seconds or 900 call-seconds. By dividing by 100, the 900 call-seconds may be restated in units of hundreds of call-seconds or centum call-seconds (CCS) such that 900 call-seconds×(1 centum call-second/100 call-seconds)=900/100 centum call-seconds=9 CCS. At an occupancy or utilization rate of 90%, the load that can be handled is 90% of 9 CCS or 90%×9 CCS=8.1 CCS or 810 call-seconds. If a service agent is capable of handling a call in a work time of 30 seconds=0.30 hundred seconds=0.30 centum seconds, such a service agent can handle 8.1 CCS/0.30 centum seconds=27 calls in the 15 minute interval.

Although workload on service centers that handle telephone calls is commonly measured in some quantity that has base units of call-seconds/server or call-seconds/channel, in the case of telephone call service requests being handled by human service agents, because each human service agent generally can only perform communication on a single call at a time (i.e., a human generally does not communicate on multiple phone calls in parallel), the maximum possible call work load that a human can handle in the 900 seconds of a 15-minute interval is 900 call-seconds/server or 9 CCS/server. Assuming no other bottlenecks or call distribution limitations, a processing system of two human service agents operating in parallel with each other can handle a maximum possible load of 2 servers×(9 CCS/server)=18 CCS for the system.

The call-seconds unit of processing load or work volume normalizes volume measurements for different types of service request processing, which may correspond to different processing rates. As a non-limiting example, a service center that handles service requests for time of day might be able to process a time of day service request in an average service request (or call) work time (AWT) of 10 seconds, which is a processing rate of 1 call (or service request)/10 seconds=0.1 calls/second. In contrast, a service center that processes tax form preparation questions may have an average work time of 3 minutes per call for a processing rate of 1 call/3 minutes×(1 minute/60 seconds)=1/180 calls/second=0.005556 calls/second to the nearest millionth. However, if both service request processing systems are utilized at 90% capacity (or 90% occupancy), in a 15 minute interval the service request load or work volume is still 90%×(15 minutes)×(60 seconds/minute)×(1 call/server or service agent)=810 call-seconds/server=8.1 CCS/server or service agent.

Furthermore, for computerized service processing, often there are multiple types of service requests that take varying amounts of time to handle or process. In the case of Internet searches, a search of a single web site might take 5 computer processor cycles to complete. In contrast, a search of the whole Internet might take 25 computer processor cycles to complete. Such a computer processing 3 searches of a single web site, and 2 Internet-wide searches would need (3×5)+(2×25)=65 cycles, which is a measure of the work volume or load on the computer in processing the service requests. In the case of human call center agent servers, a similar load or work volume number is the number of calls times the amount of time spent on each call to arrive at the number of call-seconds of work performed. As one skilled in the art will be aware, normally this call-second number is divided by 100 to get the centum (for 100) call-seconds or CCS metric. Call-seconds or CCS is a better measure of workload than number of calls because the amount of work needed to handle different types of calls varies. For instance, a 411 information call generally might require a different amount of human service agent work or processing time than a 0 operator assisted telephone call. Thus, work volume or load in call-seconds or CCS is a more consistent measure for comparing different types of service than a call volume number based on the number of calls.

Operator services have been provided by telephone companies since at least the time of manual operator switch boards when tip and ring plug boards for switching were used before the invention of the step-by-step mechanical telephone switch. At that time all calls were operator assisted. Obviously the invention of mechanical, electrical, and now optical telephone switches has long since generally replaced manual switching and connection of calls by operators. Still, various types of operator services are provided by telephone companies and usually are a revenue source to the company providing the operator services. Furthermore, many state public service commissions (PSCs), state public utilities commissions (PUCs), and other regulators place required customer service performance objectives on telephone companies offering regulated operator services. Some non-limiting examples of common performance measurements include average speed to answer or a percentage of answers within a certain time frame. Essentially calls that are not immediately answered by an operator or human service agent wait in a queue until an operator or human service agent is available. The time from the initial call coming into queuing and distribution equipment such as a telephone switch running an ACD application until a human service agent such as an operator picks up the call is known as the speed to answer. The speed to answer measures among other things the delay that an incoming service request call waits in queue before a service agent (human or otherwise) begins processing the service request call.

As operator services evolved from the needs of American Telephone and Telegraph (AT&T), Bell Labs and successors such as Bell Communications Research (or Bellcore, which is now Telcordia) developed various statistical models for the arrival distributions of telephone calls (or requests for operator service) on telephone company operator services call centers. Some of the statistical models are based on an average business day (ABD) with five times the number of calls in an ABD being expected to be received in a five day business week of Monday through Friday. Furthermore, the statistical models also take into account how the arrival of calls or service requests varies during the hours of a day.

Using these models, force management systems (FMSes) can be used to compute an expected number of operators or human service agents that will be needed to be working to handle an expected number of calls, with an expected work time of a human service agent to handle a call (i.e., the reciprocal of the processing rate of the human service agent), an expected utilization level or occupancy percentage, within an answer performance requirement of a limit to the amount of time spent waiting in queue. In some non-limiting embodiments, expected work time of a human service agent can be based on the average historical performance of many human service agents in a labor force. In other non-limiting embodiments, excepted work time of each human service agent can be based on the historical performance of each particular human's past work level. However, these two methods of determining an expected work time are not intended to be limiting, as one skilled in the art will realize that other factors can be used to determine the expected or anticipated work time for a human service agent. As yet another non-limiting example, a person that recently has been sick with a cold may have a longer expected work time than that person would if they were feeling their best. One skilled in the art will be aware that the Erlang C formula and/or other potential equations can be used to make some of these calculations for determining the number of human service agents to be working to handle the call workload.

With this description, the drawings will now be covered in more depth. Referring to FIG. 1, customers 102, 104, 106, and 108 are capable of using access terminals 112, 114, 116, and 118 respectively to generate service requests communicated over telecommunication facilities 152. Telecommunication facilities may be passive devices such as, but not limited to, wires, optical fibers, wave guides, and/or free-space propagation as well as active devices such as, but not limited to, amplifiers, repeaters, multiplexers, switches, routers, gateways, and/or any other type of hardware equipment and/or software processes that facilitate telecommunications. Service centers that process service requests delivered over telecommunication facilities 152 commonly use automated queuing and distribution process(es) and/or equipment 154. Some service requests may be handled without human intervention using automated service process(es) and/or equipment 156 which may or may not be integrated into the same equipment as the queuing and distribution process(es) and/or equipment 154. Other service requests may need or be better provided by human interaction. As shown in FIG. 1 queuing and distribution process(es) 154 may distribute or route some service requests to service terminals 162 and 164 manned by human service agents 172 and 174.

The type of access terminal 112, 114, 116, and 118 will depend on the telecommunication facilities 152. The type of service terminal 162 and 164 will depend on the types of service requests handled by human service agents 172 and 174. As a non-limiting example, an analog POTS (plain old telephone service) phone is an access terminal for the public switched telephone network (PSTN). Also, another non-limiting example is a cell phone, which is an access terminal for the cellular wireless network. In addition, a web browser is an access terminal for the world wide web of Hyper-Text Transfer Protocol (HTTP) servers. Furthermore, even though the common user interface for an analog POTS phone access terminal is a microphone and a speaker of a phone headset, other types of access terminals are possible. As another non-limiting example, handicapped customers may use some other types of access terminals to communicate over the PSTN when the handicapped customer is limited with respect to telephone interface of speech and hearing. Thus, access terminals are not intended to be limited just to telephone access of call centers but to any type of terminal that allows a human to cause the generation of a service request that is communicated over telecommunication facilities.

Figure 2:
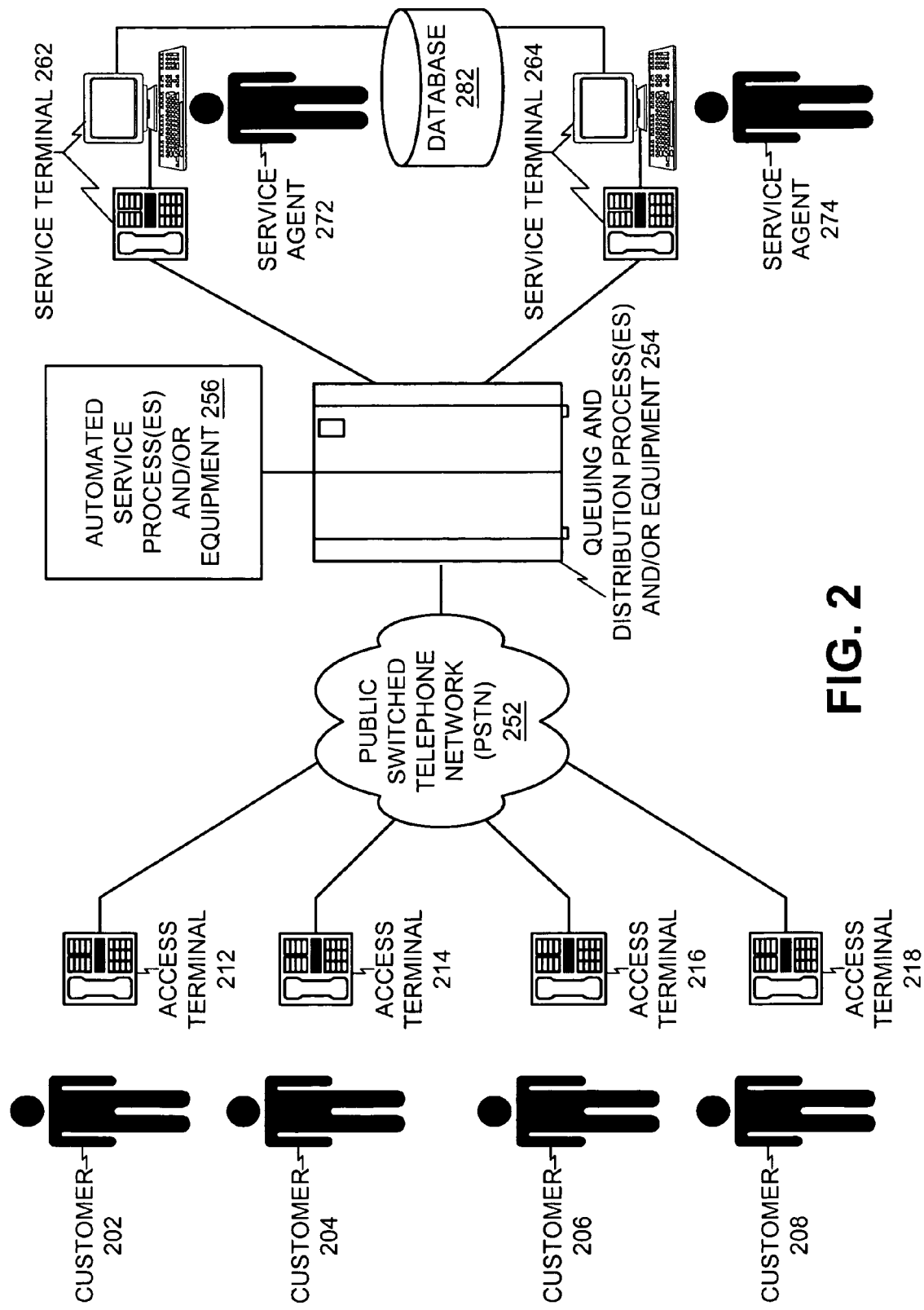
FIG. 2 is a block diagram of a call center as one non-limiting type of customer service center.

FIG. 2 further shows the common but definitely non-limiting case of a service center that handles telephone requests and is usually known as a call center. As shown in FIG. 2, customers 202, 204, 206, and 208 utilize access terminals 212, 214, 216, and 218 respectively to communicate service requests over the public switched telephone network (PSTN) 252. While access terminals 212, 214, 216, and 218 are shown as phones, this is only one non-limiting example of an access terminal. Even in the case of phones, the access terminal may vary depending on the protocol and technology of the access line, with analog POTS lines, ISDN lines, T1 lines, proprietary digital lines, digital subscriber lines being some non-limiting examples of wired access line without even considering all the technologies and protocols for wireless phone access terminals, which also are encompassed in embodiments of the present disclosure.

For call centers, queuing and distribution process(es) and/or equipment 254 normally is a telephone switch because the requests being serviced are telephone calls, and telephone switches are designed for distributing and/or routing telephone calls. Since the advent of the Electronic Switching System (ESS) No. 1 by AT&T, telephone switches generally have been controlled by stored program control digital computers that intelligently manage switch processes and connect calls through the switching fabric of the telephone switch. Essentially, the digital processors in telephone switches make the switches special purpose computers whose primary function is the real-time processing for connecting telephone calls. As special purpose computers, telephone switches usually are capable of loading various program modules to perform specific applications.

Commonly, automated call distribution (ACD) is a special computer program run on telephone switches such as large-scale carrier-class, NEBS-compliant, central office (CO) switches and potentially smaller private branch exchange (PBX) switches. Usually, ACD functionality in telephone switches is capable of routing telephone calls based on various criteria to some automated service process(es) and/or equipment 256 that is capable of handling some service requests without human intervention. Sometimes the automated service process(es) and/or equipment 256 may be integrated into the queuing and distribution process(es) and/or equipment 254. In other cases, the automated service process(es) and/or equipment 256 may be external to queuing and distribution process(es) and/or equipment 254. Sometimes the decision to perform various automated service process(es) 256 on the same equipment that handles queuing and distribution process(es) 254 will depend on the processing capacity of the equipment to be able to handle real-time call distribution at the same time as handling real-time automated service processes 256 such as but not limited to voice recognition and/or integrated voice response (IVR) of touch-tone phone keypad signals. If the equipment running the queuing and distribution process(es) 254 does not have enough processing capacity to handle these additional functions, the functions may in some cases be off-loaded to other equipment.

For calls that cannot be handled by the automated service process(es) and/or equipment 256, queuing and distribution process(es) and/or equipment 256 may route the service requests to service terminals 272 and 274 manned by human service agents 272 and 274. In the specific, non-limiting case of operator service, the human call center service agents 272 and 274 usually have service terminals 262 and 264 comprising some type of bi-directional audio interface such as a telephone as well as a computer for looking up customer inquiries for phone numbers in a database 282. Although shown as a telephone, generally human service agents in call centers are more likely to use headset telephones. Also today, computers are usually part of service terminal 262 and 264 because of the speed that computers provide in searching for information in databases 282. However, the service agents 272 and 274 also could provide other non-automated services such as searching through paper records of customer orders, court papers, or even telephone books.

Figure 3:
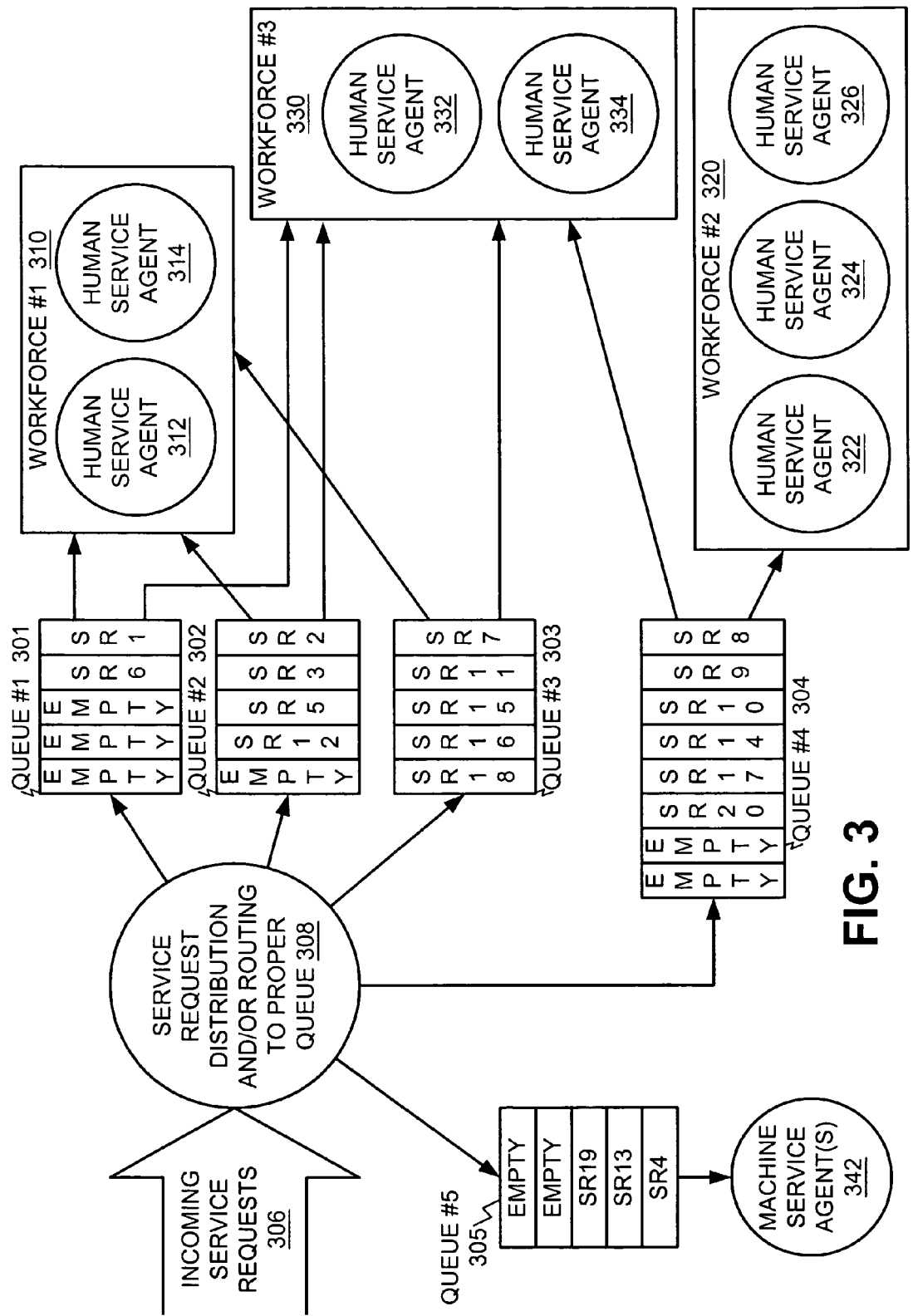
FIG. 3 is a non-limiting embodiment of a queuing configuration to handle service requests.

Turning now to FIG. 3 a non-limiting example of the distribution of service requests to agents is shown. In FIG. 3 there are five queues #1 301, #2 302, #3 303, #4 304, and #5 305, which are shown as finite length. While in theory queues may be of infinite length and software programs may have no limits on queue length, in reality the finite memory capacity of any real world system limits queue length to a finite amount. If the arrival rate of incoming service requests 306 persistently exceeds the rate at which the incoming service requests are processed and removed from the queues, then a buffer overflow or queue blowout condition generally will occur unless some of the service requests are arbitrarily dropped. As shown in FIG. 3 incoming service requests 306 are first served in service request distribution and/or routing to proper queue or block 308. While the server processing performance of block 308 is important for an automated call distribution (ACD) application, normally the decision to purchase the proper sized telephone switch to handle the ACD load is based on a long term fixed capital investment analysis as opposed to shorter term labor staffing that can vary based on demand.

As shown in FIG. 3 twenty service requests (SR) are distributed in queues #1 301 through #5 305 as SR1 through SR20. In addition, some of the queues have empty slots. Although the drawing tends to indicate that the service requests are actually placed in queues in various environments, this may be only a logical abstraction for illustrative purposes. In the particular case of an ACD application running on a telephone switch that performs circuit switching or time slot interchanging of DS0 timeslots in a channelized T1 or E1, the information actually placed in the queues is more likely to indicate the physical port and time slot of a customer with a service request for operator services than the actual service request itself. In some cases block 308 in an automated system may ask a customer that is calling operator services three questions such as: "What state?", "What city?", and "What listing?". Based on answers to these questions and/or other routing criteria the service requests for operator services may be forwarded from block 306 to at least one of queue #1 301 through queue #5 305.

The arrows in FIG. 3 indicate that workforce #1 310, comprising human service agents 312 and 314, handles service requests in queue #1 301 through queue # 3 303. In addition, workforce #2 320, comprising human service agents 322, 324, and 326, handles service requests in queue #4 304. Also, workforce #3 330, comprising human service agents 332 and 334, handles service requests in queue #1 301 through queue #4 304. Finally, the service requests in queue #5 305 are serviced by at least one machine service agent 342, which in a non-limiting case might utilize voice recognition and/or integrated voice response (IVRs) or touch-tone keypad signal interpretation. Machine service agent(s) 342 also would be considered as a server in queuing theory and would have a service processing rate at which it is capable of processing various types of service requests.

In general, a workforce in FIG. 3 is a grouping of human service agents with a similar set of capabilities for handling certain types of service requests. In a non-limiting example, workforce #1 310 may comprise English speaking operators as the human service agents 312 and 314; workforce #2 320 may comprise Spanish speaking operators as human service agents 322, 324, and 326, and workforce #3 330 may comprise English-Spanish bilingual operators as human service agents 332 and 334. In another non-limiting example, incoming service requests 306 might be routed to different queues based on voice recognition interpretation of the state and/or for a directory assistance lookup. For example, an operator that lives in Atlanta is more likely to realize that Atlanta has many different streets that include the name "Peachtree" than another operator that lives in a different state. Thus, workgroup #1 310, which might be based in Georgia, may be setup to handle requests for directory assistance in Georgia first with workforce #3, which may be based in North Carolina, being configured to only handle service requests for Georgia directory assistance when workforce #1 310 is overloaded.

Furthermore, different workforces may even follow different procedures to handle different types of calls. For example, workforce #1 310 could be a company's inside sales agents, while workforce #2 320 is customer service order inquiry. In the particular case of operator services within a telecommunications carrier company, usually different types of operator service are selected based on the number dialed by the customer. For instance, 411 information service is a different type of operator service from "0" operator assisted calls, which is still different from (area code) 555-1212 long distance or toll directory assistance. As most carriers provide written rules for performing certain types of job functions, normally operators (or human service agents) go through training on the proper steps to follow in performing the different operator services functions and receive the written down rules in the form of a methods and procedures (M&P) manual.

While some operator service employees or human service agents may be cross-trained and have the capability to work with different types of calls such as "0" as well as 411, sometimes allowing such a person to handle both types of calls during a single session is inefficient because the cross-trained individual has to spend time context shifting between the two different processes for handling "0" service requests as opposed to 411 service requests. Although shifting from performing one process or method & procedure to performing another process or method & procedure may be called a context shift for a multi-tasking computer processor, such a change for a person could be said to introduce "think time" that slows down the processing rate of the human service agent (i.e., the average work time or AWT generally increases when a human service agent in operator services has to handle two different types of calls). Workforces or workgroups generally are logical constructs of the ACD software that allow system administrators to select groups of human service agents (or operators in the non-limiting case of an operator services call center) with certain capabilities to handle specific types of service requests. Furthermore, human service agents have varying service request processing rates (i.e., the reciprocal of the average work time or AWT). In a particular business situation, a company may want to group all the higher quality and higher processing rate (i.e., lower average work time or AWT) human service agents in one group to handle the more profitable customers while grouping the lower quality and lower processing rate (i.e., higher average work time or AWT) in another group to handle less profitable customers.

For service centers, the logical grouping of human service agents into workgroups or workforces allows different service offerings to be provided with different capabilities and features. According to basic economic theory and Adam Smith's specialization of labor, the logical grouping of the labor of human service agents into specialized groups and efficiently routing or distributing service requests to the most efficient group at handling the service requests could provide advantages over competitors. Furthermore, economic theory states that firms offering multiple services or products should apply resources to the services or products according to the ratio of the marginal benefit to marginal cost of the last unit of one service or product being equal to the ratio of the marginal benefit to marginal cost of the last unit of another service or product. Based on these economic rules, firms could staff various service centers and group human service agents into workforces or workgroups based on the marginal benefits and marginal costs of each service.

However, most firms probably do not have this marginal benefit and marginal cost information readily available for each type of service. Instead, most service centers decide on the acceptable level of service that they want for their strategic position in the market place. Based on this service level and expectations or forecasts of the distributions and arrival rates of service requests, and also based on the expected server processing performance of the human service agents, and utilization or occupancy decisions, firms normally use various types of labor force management systems (FMSes) to develop a schedule staffing line for service centers that identifies the anticipated number of human service agents that will be needed on specific days at various times to meet the forecasted or expected demands for service requests by customers.

FIG. 4 shows one non-limiting daily example of a labor force staffing line for a service center. The daily times are broken down into 15 minute increments from 12 midnight (00:00 in 24-hour format) to 11:45 PM (23:45 in 24-hour format). The 15 minute increments are only for non-limiting example purposes and other time granularities could be used as well with labor employment contracts often specifying the rules under which human service agents are expected to login or logout of an ACD system to handle call center service requests. As shown in FIG. 4, the staffing is broken down into three groups as workforces #1, #2, and #3. According to FIG. 4, workforce #1 needs 13 people from midnight (00:00) until 12:15 AM (00:15), while workforce #3 needs 7 people from 11:15 PM (23:15) until 11:30 PM (23:30).

Figure 5:
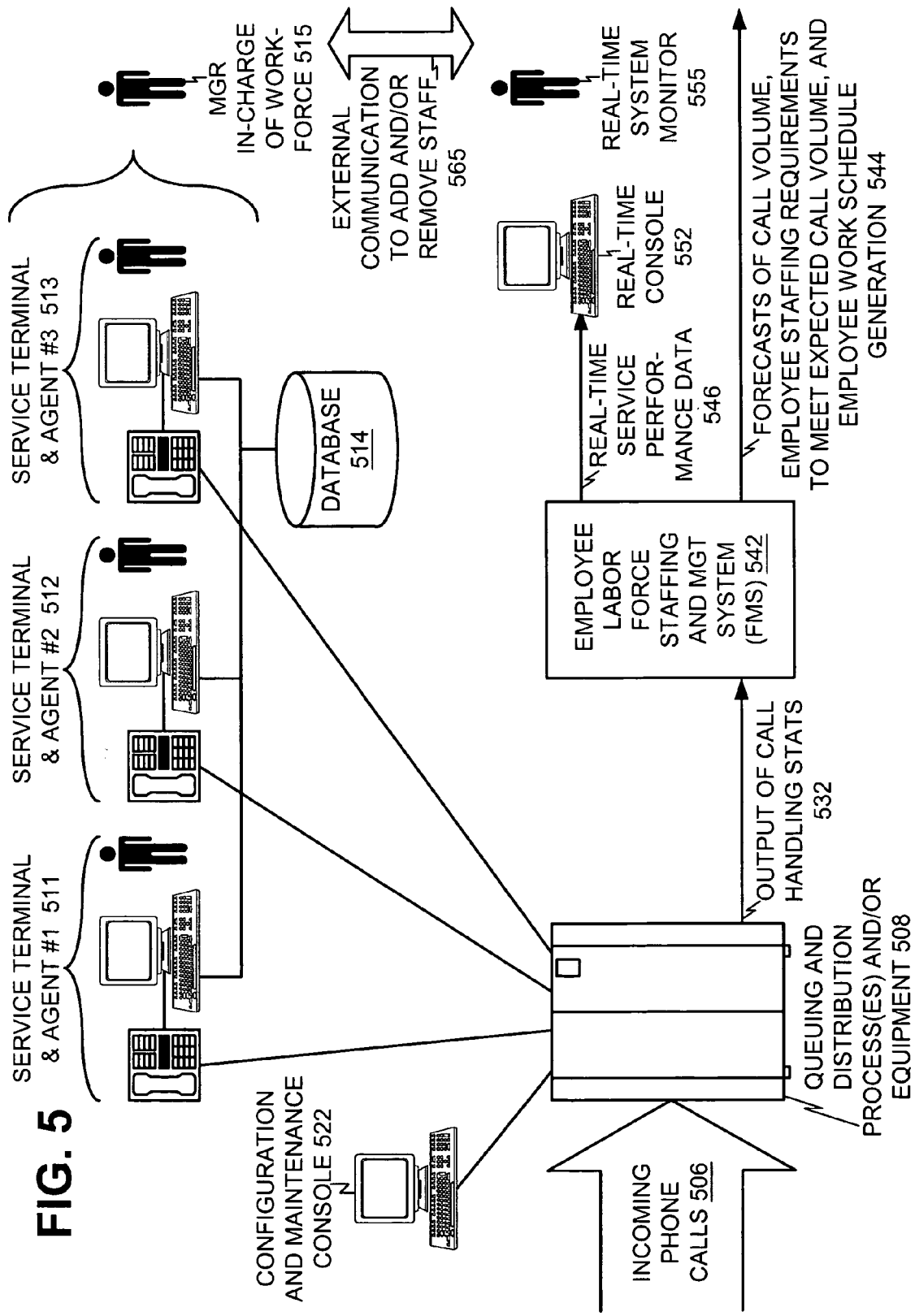
FIG. 5 is a system diagram of a service center and a force management system (FMS) without feedback to an automated service request distribution system such as, but not limited to, an ACD.

FIG. 5 shows a call center that could be used before processing inbound phone calls including those to various forms of operator services such as but not limited to 411, "0" operator assisted call, local directory assistance, and (area code) 555-1212 long-distance toll directory assistance. In FIG. 5 incoming phone calls 506 are delivered to queuing and distribution process(es) and/or equipment 508, which usually is some form of a telephone switch because one of the main purposes of a telephone switch is to switch and route telephone calls. While historically telephone switches such as central office switches and/or PBXes have used circuit switching technologies, one skilled in the art will be aware that various forms of virtual-circuit and datagram packet, frame, and cell switching technologies have more recently been developed and can be used for telephone call switching. Examples of virtual circuit packet switching include but are not limited to X.25, frame relay, and asynchronous transfer mode (ATM). Examples of datagram packet switching include but are not limited to ethernet switching as well as Internet Protocol (IP) switching and routing.

As further shown in FIG. 5 queuing and distribution process(es) and/or equipment 508 is capable of distributing the incoming phone calls 506 to terminals manned by human service agents as service terminal and agent #1 511, #2 512, #3 513, which are connected to database 514. Normally the employee laborers of human service agents are managed by a manager in-charge of the workforce 515. Furthermore, queuing and distribution process(es) and/or equipment 508 generally perform an automated call distribution (ACD) function to distribute and switch telephone calls. The growth of digital computer technology has basically led to most equipment for automated switching of telephone calls to be controlled by stored program control microprocessor systems. As a result many types of equipment for switching and distributing telephone calls behave as special purpose computers with consoles for configuration and/or maintenance 522 of queuing and distribution process(es) and/or equipment 508 such as but not limited to a device for switching telephone calls and an ACD process running on that device.

As most equipment for handling and routing telephone calls and performing an ACD function utilizes stored program control processors, the equipment commonly generates information on the telephone calls it is handling, and such information may include but not be limited to phone call billing data, notices of error conditions, and system performance data. Therefore, FIG. 5 shows queuing and distribution process(es) generating an output of call handling statistics 532, which are an input into employee labor force staffing and management system (FMS) 542. The special purpose computers of equipment used for telephone switching historically have been closed development environments in which the software programs and/or hardware expansion boards are only provided by the same manufacturing vendor that makes the telephone switch. Although such closed architectures are common for main frame computers, they are in sharp contrast to the open architecture of most personal computers with industry standard architectures that allow third-party development of software programs and/or hardware expansion boards and interfaces. Usually the processing capacity of telephone switching equipment is predominately allocated to the primary function of the real-time switching of telephone calls, which may leave very little excess processing capacity for other tasks on a heavily loaded telephone switching system. As a result of 1) the finite processing capacity of telephone switching systems, 2) the closed hardware architectures which limit the ability to add additional processing capacity, and/or 3) the closed software architectures which limit the ability to develop and/or modify additional software applications, other applications and/or non real-time tasks are loaded on external processing systems such as but not limited to employee labor force staffing and management system (FMS) 542 instead of being loaded directly on a telephone switching system that might be running queuing and distribution processes such as an ACD.

As shown in FIG. 5 employee labor force staffing and management system 542 is utilized to produce at least two different types of output based on the input of call handling statistics 532, which are output from queuing and distribution process(es) and/or equipment 508. First, FMS 542 analyzes the call handling statistics 532 and uses an analytical model to develop forecasts of call service request volume 544. The forecasts of call volume and estimates of human service agent processing performance (i.e., the reciprocal of the average work time or AWT of a call) in handling telephone call service requests are used together with business decisions on response time, queuing delay, or call answer performance as well as system utilization or occupancy levels in various queuing theory models and equations such as but not limited to Erlang C to generate employee staffing requirements to meet expected call volume 544 at a service level or answer performance that is acceptable to business decision makers running the call center. One skilled in the art will be aware of the Erlang C formula and variations thereof, which can be used to properly size a system with the necessary resources to meet response time criteria. Also, one skilled in the art will be aware that often Erlang C calculations are made using pre-computed Erlang tables instead of direct input of the system values into the formula. In the case of telephone company operator services, the answer performance criteria or service levels for a call center are sometimes specified by an external regulatory agency. After the employee staffing requirements to meet expected call volume 544 are determined, employees or human service agents generally are assigned various work shifts and times according to labor contract terms in order to meet the scheduled work staffing line (as shown in the non-limiting example of FIG. 4). Thus, FMS 542 is capable of generating forecasts of call volume, employee staffing requirements to meet the expected call volume, and employee work schedules 544, which all generally are non-real-time tasks because employee staffing and work schedules usually have to be prepared for human employees or human service agents some time in advance to allow human beings to plan their lives in accordance with their work schedule.

In addition to the non-real-time outputs of call volume forecasts, employee staffing requirements, and employee work schedule generation 544, FMS 542 also can be used to generate reports and analyses of the near real-time performance of the call handling capabilities of queuing and distribution process(es) and/or equipment 508. This real-time service performance data 546 is output from FMS 542 to real-time console 552 that displays the information in a format that is more useful to decision makers than the raw output of call handling statistics 532 from the queuing and distribution process(es) and/or equipment 508. A decision making person such as real-time system monitor 555 can monitor the real-time console 552 to react to unexpected changes in call volume which were not predicted in call volume forecasts on which the staffing levels for human service agents were based.

In general, the problem for managerial decision makers is to properly allocate resources to meet customer demand. While the manufacturers of the software and/or hardware of queuing and distribution process(es) and/or equipment 508 may include mechanisms for managing the software and/or hardware resources of the queuing and distribution process(es) and/or equipment 508, these manufacturers generally do not include mechanisms for the general management of work allocation of employee labor for human service agents manning call centers. Instead of using a telephone switch for managing employee work allocations, FMS 542 provides managers with more mechanisms for efficiently allocating work and properly staffing call centers with an efficient number of human service agent employees to meet the required service level. However, often optimal resource allocation decisions are not made because the resource allocation problem of allocating switching equipment resources in queuing and distribution process(es) and/or equipment 508 is considered separately from the resource allocation problem of properly staffing the call center with enough human service agents.

In general, the real-time system monitor 555 is responsible for monitoring the real-time performance of the queuing and distribution process(es) and/or equipment 508 and adjusting resource allocations accordingly. Although the resource allocations and configurations of a telephone switch operating as queuing and distribution process(es) and/or equipment 508 can be changed through configuration and maintenance console 522, normally the human skill sets needed to handle the complex instructions to reconfigure a telephone switch are significantly different from the human skill sets of the real-time system monitor 555 that monitors resource allocation efficiency for the call center. Commonly, the user interfaces and configuration manuals for telephone switches involve manuals that are many inches thick and often necessitate significant training. In addition, a mistake in entering commands to change the configuration of a telephone switch through configuration and maintenance console 522 could lead to the disastrous result of crashing the telephone switch and knocking out all the customer access to operator services through that switch.

In addition, many changes to the configuration of telephone switches including ACD processes do not become immediately active. Instead, for some non-limiting types of telephone switches, the changes may only be made active once a call service agent logs out and logs back into the switch. In some ways this situation is similar to having to restart some computer processes after making configuration changes. Rearranging the resources of the telephone switching equipment through software configuration changes may result in more efficient handling of service requests. In a non-limiting example, the configuration of a telephone switch may be changed to adjust the grouping of call center human service agents into different workforces based on load. Generally, each call center agent has a login identifier (ID) that is used by a telephone switch to identify a particular human service agent. As another non-limiting example, a telephone switch may allow the profiles to be developed on the system to group operators or call center service agents into workgroups or workforces to handle different types of calls. In addition, another non-limiting example of changing the call handling performance of a service center would be to change the call routing rules in telephone switches by changing the configuration of the switch. Yet one more non-limiting example would be to adjust the queuing priority scheme of an ACD process running on a telephone switch to increase the priority of servicing one type of calls while essentially decreasing the priority of servicing another type of calls.

As one skilled in the art of priority queuing will be aware, many different queuing priority schemes can be used. However, one simple queuing priority scheme is to have human service agents service the next available service request with the longest wait time from multiple queues. Instead of the wait time of a service request being completely based on the amount of time that a service request has been waiting in a queue, an additional amount of time can be added to the listed wait time of service requests that are to be served quicker in order to make such service requests appear to be older than they really are. As a result of adding such arbitrary amounts to the wait times of service requests in specific queues, a queue service discipline that handles the service requests with the oldest wait time first will end up servicing the queues containing service requests with such an arbitrary addition of more wait time at a faster rate than other queues are serviced. In a non-limiting example, a configuration change to a telephone switch could be made to change the priority queuing rules of an ACD process by changing an arbitrary amount of wait time that is added to a counter of the amount of time that a service request has been waiting in a queue to make the service request appear older.

All these types of changes are just some non-limiting examples of variations that could be performed to better allocate resources in the queuing and distribution process(es) and/or equipment 508 to allow efficient handling of the incoming phone calls 506. However, as mentioned previously, the skill sets of telephone switch technicians and administrators generally are quite different from the skill sets of real-time system monitors 555. Furthermore, changes to telephone switch settings are often done during times of low demand on the switch such as 2 AM in the morning or during scheduled downtimes to limit the number of customers that might be affected by a mistake in programming the switch that crashes the system. Thus, configuration and maintenance consoles 522 of telephone switches generally are not designed to allow frequent programming changes to react to real-time changes in call volume that differ from expectations.

As a result, the primary mechanism for reacting to changes in call volume that are different from expectations is to adjust the number of human service agents that are logged into the queuing and distribution process(es) and/or equipment 508 to handle the incoming phone calls 506. Real-time monitor 555 monitors the real-time call handling performance of the system and utilizes external communication 565 with the manager in-charge of a workforce 515 to tell the in-charge manager 515 to add people to and/or remove people from the human service agent staff. Thus, without reprogramming the configuration of the telephone switch, the real-time system monitor 555 generally can adjust performance of a call processing system by changing the allocation of human resources assigned to staff the scheduled line of human service agents that are logged in to the ACD to handle telephone calls. Furthermore, reprogramming the telephone switch is a difficult process for which the real-time system monitor 555 is not normally trained.

Figure 6:
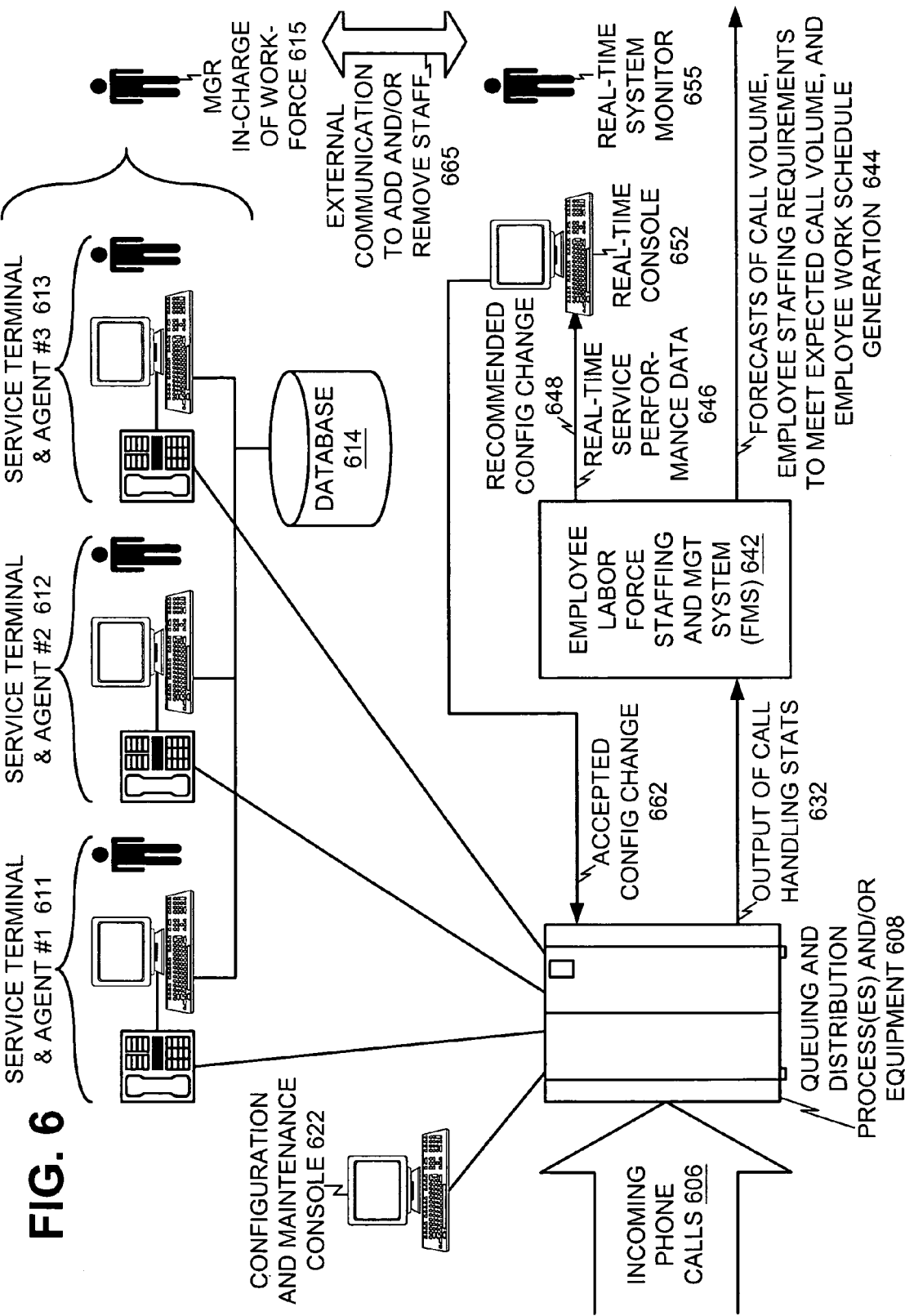
FIG. 6 is a system diagram of a service center and a force management system (FMS) with recommended configuration change feedback that may be accepted and forwarded to an automated service request distribution system such as, but not limited to, an ACD.

Turning now to FIG. 6, incoming phone calls 606 are received in queuing and distribution process(es) 608. Generally phone calls that are not handled by automated equipment are handled by human service agents, which are shown as service terminals and agents #1 611, #2 612, and #3 613, which may access database 614 to resolve a customer's request for service such as but not limited to a telephone directory phone number lookup. The manager in-charge of the workforce 615 manages human service agents in a workgroup or workforce such as service terminals and agents #1 611, #2 612, and #3 613. The configuration and maintenance console 622 might be used by a switch administrator or switch technician to monitor and/or reconfigure a telephone switch. However, such configuration changes generally are not designed to be performed as real-time changes in reaction to the demands of call volume. Generally, a telephone switch with queuing and distribution process(es) and/or equipment 608 has many types of outputs including but not limited to the output of call handling statistics 632, which are input into employee labor force staffing and management system (FMS) 642. FMS 642 may generate different outputs including but not limited to non real-time outputs such as forecasts of call volume, employee staffing requirements to meet the expected call volume, and/or employee work schedules 644. Other outputs may be more real-time oriented such as real-time service performance data 646 and recommended configuration change 648. The real-time service performance data is provided to real-time console 652 to allow a human real-time system monitor 655 to monitor the actual performance of the queuing and distribution process(es) and/or equipment 608 in handling customer service requests in the form of telephone calls.

In addition, recommended configuration change 648 specifies some changes to the configuration of the queuing and distribution process(es) and/or equipment 608 that could improve the call handling performance of the call center. In general, queuing and distribution process(es) and/or equipment 608 may include information on the grouping of human service agents or operators into workgroups or workforces to handle particular queues. Furthermore, queuing and distribution process(es) and/or equipment 608 may know the current status as of particular service agents or operators as logged in or logged out, and may even maintain some historical data on the performance of human service agents or operators. However, queuing and distribution process(es) and/or equipment 608 generally do not have any knowledge of the planned schedule for human service agent staffing of the call center. Instead, this information is maintained in FMS 642. This future information on expected call volumes and planned staffing levels allows FMS 642 to generate more intelligent recommended configuration changes 648 for queuing and distribution process(es) and/or equipment 608. Furthermore, the real-time system monitor 655 only has to decide whether to accept the suggested configuration changes and does not need to have the skills of telephone switch technician to be able to program a telephone switch to change its configuration. Instead, in a non-limiting embodiment real-time console 648 or another processor can generate the proper commands to cause the recommended configuration change 648 to be entered into the queuing and distribution process(es) and/or equipment 608 as accepted configuration change 662 after the recommended configuration change is accepted by the real-time system monitor 655 personnel. This automated generation of the commands for changing switch configuration will significantly reduce the possibility of a switch configuration programming error that may occur when a human manually enters the commands for reconfiguring a telephone switch.

With the added functionality of accepting recommended configuration changes 648 and 662, the real-time system monitor 655 can adjust the number of human service agents that are working at a particular time through external communications 665 with the manager in-charge of a workforce 615 to add and/or remove human service agents. In addition, the real-time system monitor 655 can adjust the behavior of the queuing and distribution process(es) and/or equipment 608 to more efficiently handle incoming phone calls 606 and more quickly react to real-time changes in call volume and/or call type distributions. Thus, the system of FIG. 6 provides additional flexibility allowing a manager responsible for allocation of resources in a call center environment (e.g., real-time system monitor 655) to adjust not only the number of human service agents or operators but also the telecommunications switch configuration to meet the real-time demands for customer service on a call center or other type of service center.

Figure 7:
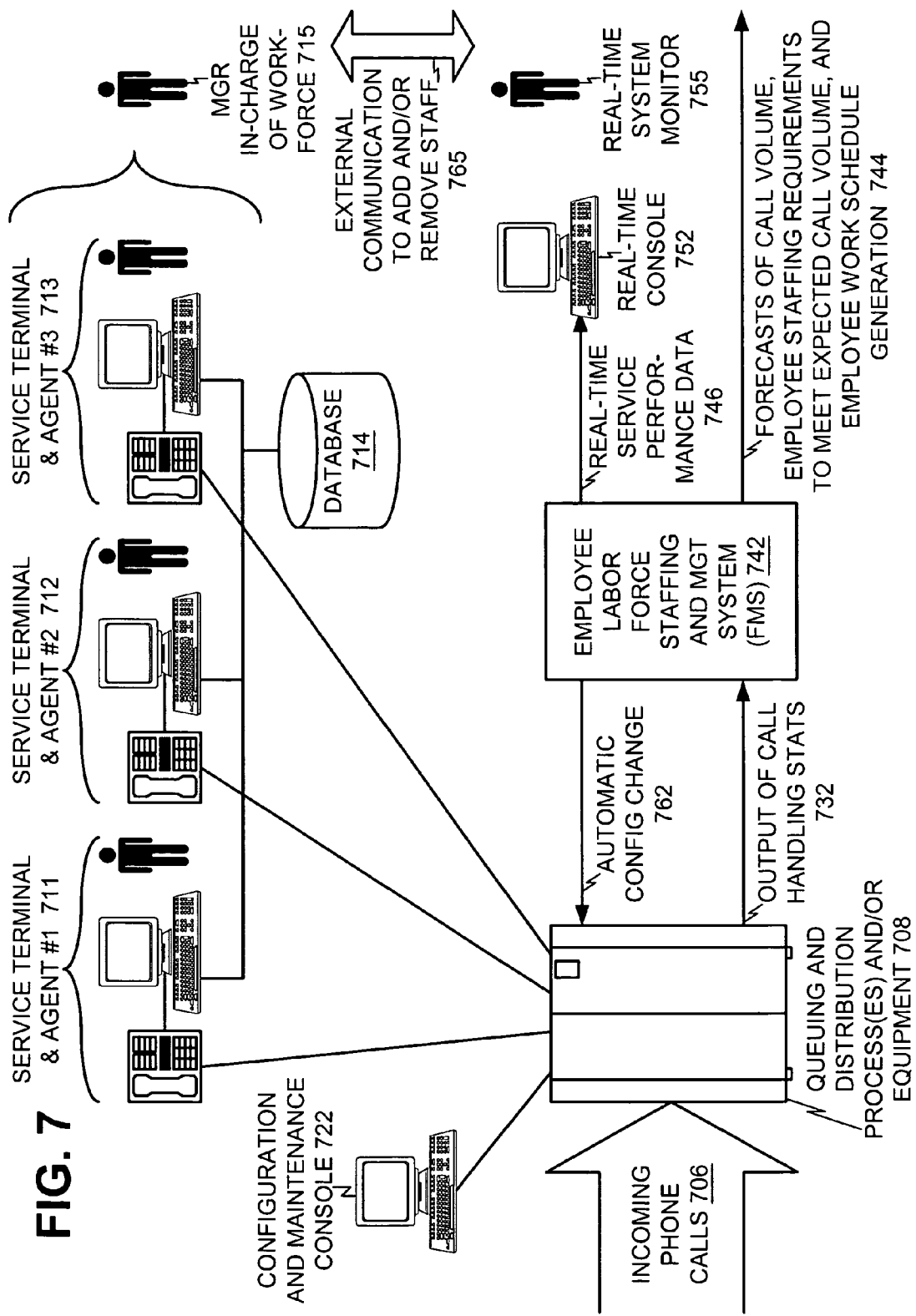
FIG. 7 is a system diagram of a service center and a force management system (FMS) with automatic configuration change feedback to an automated service request distribution system such as, but not limited to, an ACD.

Referring now to FIG. 7, incoming phone calls 706 are received in queuing and distribution process(es) 708. Generally phone calls that are not handled by automated equipment are handled by human service agents, which are shown as service terminals and agents #1 711, #2 712, and #3 713, which may access database 714 to resolve a customer's request for service such as but not limited to a telephone directory phone number lookup. The manager in-charge of the workforce 715 manages human service agents in a workgroup or workforce such as service terminals and agents #1 711, #2 712, and #3 713. The configuration and maintenance console 722 might be used by a switch administrator or switch technician to monitor and/or reconfigure a telephone switch. However, such configuration changes generally are not designed to be performed as real-time changes in reaction to the demands of call volume. Generally, a telephone switch with queuing and distribution process(es) and/or equipment 708 has many types of outputs including but not limited to the output of call handling statistics 732, which are input into employee labor force staffing and management system (FMS) 742. FMS 742 may generate different outputs including but not limited to non real-time outputs such as forecasts of call volume, employee staffing requirements to meet the expected call volume, and/or employee work schedules 744. Other outputs may be more real-time oriented such as real-time service performance data 746 and automatic configuration change 748. The real-time service performance data is provided to real-time console 752 to allow a human real-time system monitor 755 to monitor the actual performance of the queuing and distribution process(es) and/or equipment 708 in handling customer service requests in the form of telephone calls.

In addition, automatic configuration change 762 specifies some changes to the configuration of the queuing and distribution process(es) and/or equipment 708 that could improve the call handling performance of the call center. In general, queuing and distribution process(es) and/or equipment 708 may include information on the grouping of human service agents or operators into workgroups or workforces to handle particular queues. Furthermore, queuing and distribution process(es) and/or equipment 708 may know the current status as of particular service agents or operators as logged in or logged out, and may even maintain some historical data on the performance of human service agents or operators. However, queuing and distribution process(es) and/or equipment 708 generally do not have any knowledge of the planned schedule for human service agent staffing of the call center. Instead, this information is maintained in FMS 742. This future information on expected call volumes and planned staffing levels allows FMS 742 to generate more intelligent automatic configuration changes 762 for queuing and distribution process(es) and/or equipment 708. In FIG. 7, the real-time system monitor 755 does not have to decide whether to accept the automatic configuration changes and does not need to have the skills of telephone switch technician to be able to program a telephone switch to change its configuration. Instead, in a non-limiting embodiment FMS 742 or another processor can generate the proper commands to cause the automatic configuration change 762 to be entered into the queuing and distribution process(es) and/or equipment 708 without needing the configuration change to be accepted by the real-time system monitor 755 personnel. This automated generation of the commands for changing switch configuration will significantly reduce the possibility of a switch configuration programming error that may occur when a human manually enters the commands for reconfiguring a telephone switch.

With the added functionality of automatic configuration changes 762, the real-time system monitor 755 can adjust the number of human service agents that are working at a particular time through external communications 765 with the manager 715, who is in-charge of a workforce, to add and/or remove human service agents. In addition, the FMS 742 will be aware of the expected and/or actual number of human service agents and can adjust the behavior of the queuing and distribution process(es) and/or equipment 708 to more efficiently handle incoming phone calls 706 and to more quickly react to real-time changes in call volume and/or call type distributions. Thus, the system of FIG. 7 provides additional flexibility allowing the allocation of resources in a telephone switch to be automatically adjusted to meet the real-time demands for customer service on a call center or other type of service center.

The concepts of the preferred embodiments of the present disclosure will work with various types of service centers such as but not limited to a call center using centralized and/or distributed ACD processes and/or equipment. One particular industry change simplifying the deployment of call centers is the advent of softswitches. In general, softswitches open up the hardware and/or software architectures of telecommunication switches to allow third party development of software and/or hardware. Furthermore, softswitches utilize abstractions and provide interfaces to separate switch control logic from switching fabric. Such a separation of control logic from switching fabric allows easier migration from circuit switching networks to virtual circuit packet switching networks (such as but not limited to ATM) as well as migration to datagram packet switching networks based upon the Internet protocol.

Figure 8:
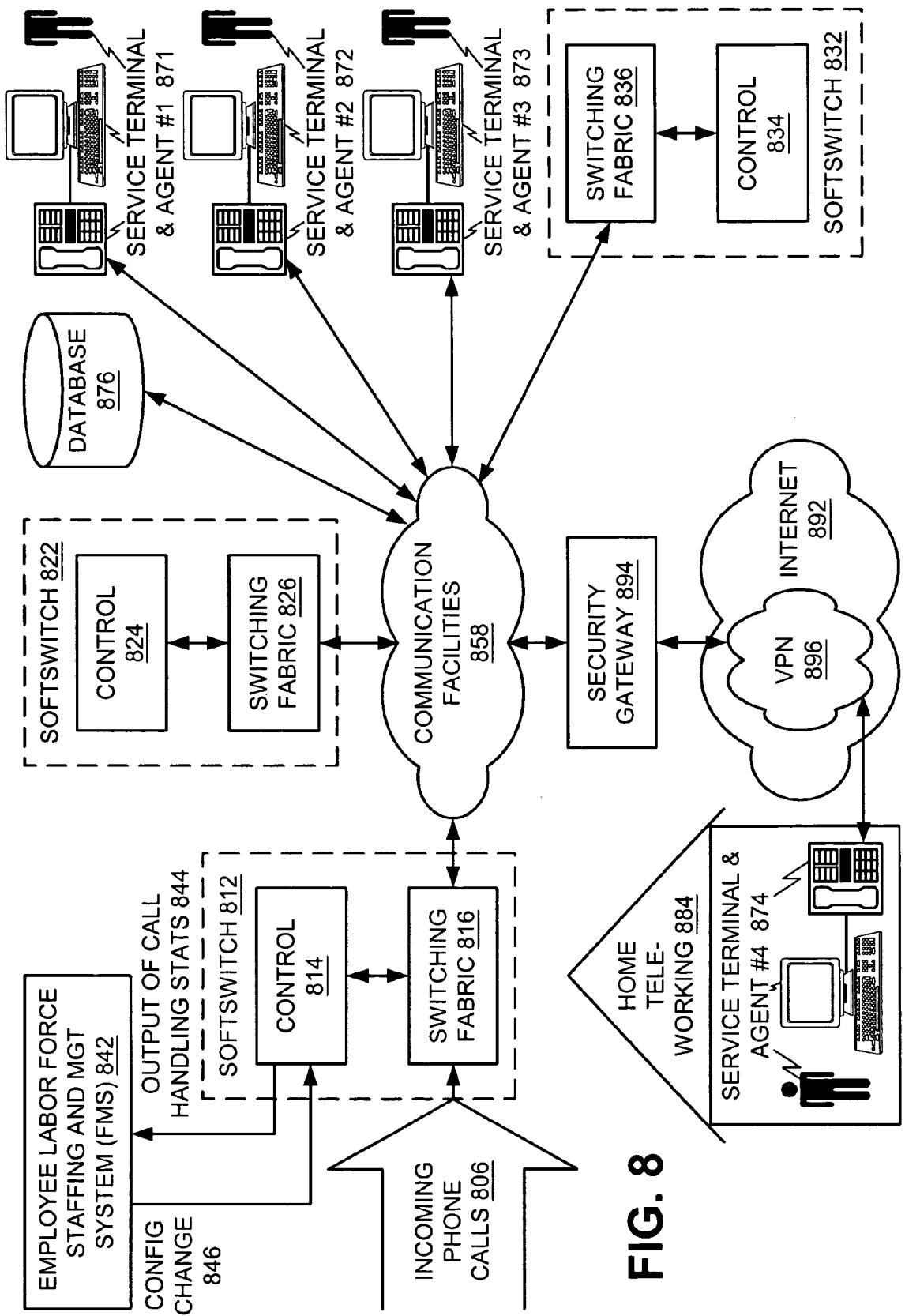
FIG. 8 is a system diagram of a distributed service center.

FIG. 8 shows a distributed ACD utilizing a plurality of softswitches to handle the service requests of incoming phone calls 806. In particular incoming phone calls 806 may be initially received by softswitch 812 which comprises control 814 and switching fabric 816. In addition FIG. 8 shows softswitch 822 with control 824 and switching fabric 826 as well as softswitch 832 with control 834 and switching fabric 836. Softswitches 812, 822, and 832 are interconnected over communication facilities 858 which will vary depending on the architecture types of switching fabrics 816, 826, and 836.

Furthermore, FIG. 8 shows employee labor force staffing and management system (FMS) 842 receiving the output of call handling statistics 844 from at least one control 814 element of a softswitch 814. In addition, FMS 814 passes automatic or recommended configuration changes to at least one control 814 element of at least one softswitch 812. Such configuration changes 846 could change the queuing and distribution behavior of softswitch 812 and might also be communicated to other softswitches 822 and/or 832. This feedback of configuration changes 846 from FMS 842 allows the softswitches performing the queuing and/or distribution function in a call center to be efficiently reconfigured to meet the real-time demands of customer service requests. In addition, the open hardware architecture and separation of control 814 from switching fabric 816 allows the force management processes to potentially be run on the same processor(s) that handle real-time call control 814 because more processing performance can be added to an open architecture to handle both the real-time demands of call processing as well as the non-real-time demands of FMS functionality.

FIG. 8 further shows service terminals and agents #1 871, #2 72, and #3 873 that are connected to communication facilities 858 over which they receive the distributed incoming service requests. While many telephone switches and ACD platforms support remote call center agents, many of these older remote call center technologies were not cost effective or practical for remote service terminal and agent #4 874 operation in a home teleworking 884 environment. The development of high speed digital Internet access over wireless communication or wired communication such as but not limited to digital subscriber lines and/or cable modems now offers the capability to effectively deploy call center service terminals and agents 874 in a home. In general, a home teleworking 884 call center agent could utilize similar access technologies for searching database 876 in a directory assistance telephone listing lookup request. Furthermore, the use of IP technology for communicating the audio of telephone calls would allow communication to be established over the Internet 892 between a customer's incoming phone call 806 and service terminal and agent #4 874. Thus, voice-over-IP (VoIP) technology allows communication of the audio for customer service requests over the Internet which is also capable of carrying the computer data for lookups in database 876.

One of the major concerns of Internet usage is security. Thus, FIG. 8 shows Internet 892 being connected to the private communication facilities 858 through security gateway 894 which in a non-limiting case may be a firewall. In addition, service terminal and agent #4 874 uses virtual private network (VPN) 896 to provide some encryption, tunneling, and/or authentication security for communications over Internet 892 to private communication facilities 858.

This development of cost effective and practical home teleworking technologies allows new call center applications and staffing policies. Instead of being limited based on floor space and the number of available service terminals at a physical location, the call center agents' homes become their workspaces. In addition, no longer do managers necessarily have to staff call centers with rigid and inflexible work-shifts of seven to eight hours. Instead, managers can invite employees to work at different times by adjusting compensation rates that may be based on per call productivity. The invitations to work may be communicated electronically using techniques such as, but not limited to, i-pages, instant messaging, and/or email. Then employees can choose to work at their times of most convenience. In a non-limiting example a college student may prefer to work a few hours early in the morning, attend class during the afternoon, and work a few more hours in the evening. Such staffing flexibility allows call center managers to recruit a larger number of employees who will be willing to work under the flexible conditions.

Any process descriptions or blocks in any flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The generation of configuration changes by FMSes 642, 742, and/or 842 may be implemented as a computer program, which comprises an ordered listing of executable instructions for implementing logical functions. As such the behavior of FMS 642, 742, and/or 842 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CD-ROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations, as described, may be made. All such changes, modifications, and alterations should therefore be seen as within the scope of the disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles herein. All such modifications and variations are intended to be included herein within the scope of this disclosure.

Therefore, at least the following is claimed:

1. A system to remotely access a service center, the system comprising:
   at least one force management system;
   at least one softswitch that transmits information to and receives information from the at least one force management system; and
   at least one service terminal at a remote location connected over an internet to the at least one softswitch.

2. The system of claim 1,
   wherein the at least one softswitch comprises a switching fabric for switching voice-over-IP telephone calls.

3. The system of claim 1,
   wherein the remote location is provided with notice of an invitation to work as a service center agent.

4. The system of claim 1,
   wherein virtual private network (VPN) technology is used to provide security for access over the internet.

5. The system of claim 1,
   wherein the service center is a call center that processes telephone call service requests.

6. The system of claim 5,
   wherein the telephone call service requests are incoming phone calls.

7. The system of claim 1,
   wherein the information received by the at least one softswitch from the at least one force management system is at least one configuration change for the at least one softswitch for increasing efficiently of handling service requests.

8. The system of claim 7,
   wherein the at least one configuration change adjusts at least one wait time statistic added to at least one statistic of a service request in a queue.

9. The system of claim 7,
   wherein the at least one configuration change adjusts a grouping of human service agents into at least one workforce.

10. A method of remotely accessing a service center, the method comprising:
    providing a connection between at least one force management system and at least one softswitch;
    transmitting information from the at least one softswitch to the at least one force management system;
    receiving information at the at least one softswitch from the at least one force management system; and
    providing a connection between at least one service terminal at a remote location and the at least one softswitch over an internet.

11. The method of claim 10,
    wherein the at least one softswitch comprises a switching fabric for switching voice-over-IP telephone calls.

12. The method of claim 10,
    wherein the remote location is provided with notice of an invitation to work as a service center agent.

13. The method of claim 10,
    wherein virtual private network (VPN) technology is used to provide security for access over the internet.

14. The method of claim 10,
    wherein the service center is a call center that processes telephone call service requests.

15. The method of claim 14,
    wherein the telephone call service requests are incoming phone calls.

16. The method of claim 10,
    wherein the information received by the at least one softswitch from the at least one force management system is at least one configuration change for the at least one softswitch for increasing efficiency of handling service requests.

17. The method of claim 16,
    wherein the at least one configuration change adjusts at least one wait time statistic added to at least one statistic of a service request in a queue.

18. The method of claim 16,
    wherein the at least one configuration change adjusts a grouping of human service agents into at least one workforce.

19. A method of remotely accessing a service center, the method comprising:
    providing a connection between at least one force management system and at least one softswitch;
    transmitting information from the at least one force management system to the at least one softswitch;
    receiving information at the at least one force management system from the at least one softswitch; and
    providing a connection between at least one service terminal at a remote location and the at least one softswitch over an internet.

20. The method of claim 19,
    wherein the service center is a call center that processes telephone call service requests.

* * * * *